Dec. 4, 1923.
C. GIRL ET AL
AUTOMOBILE BUMPER
Filed Jan. 31, 1923
1,476,605
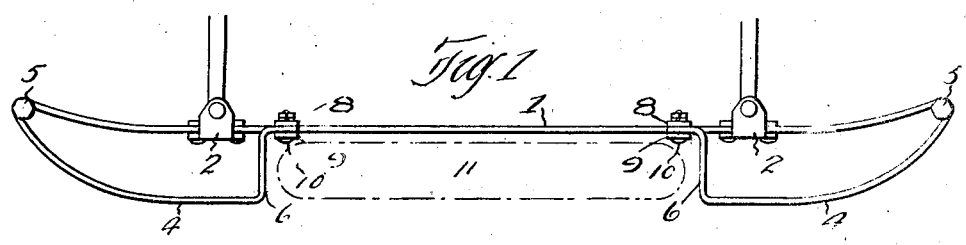
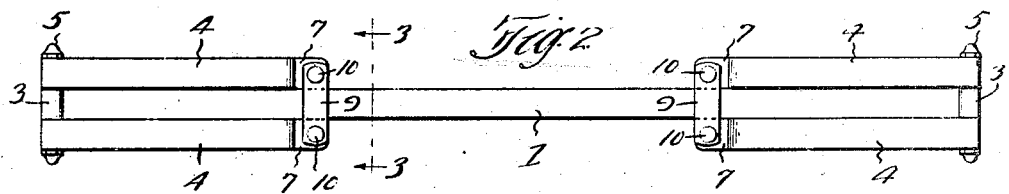
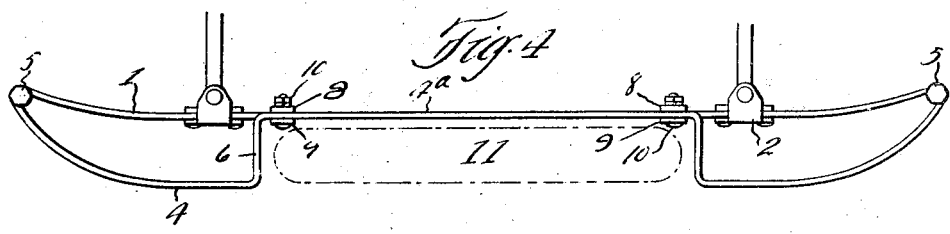
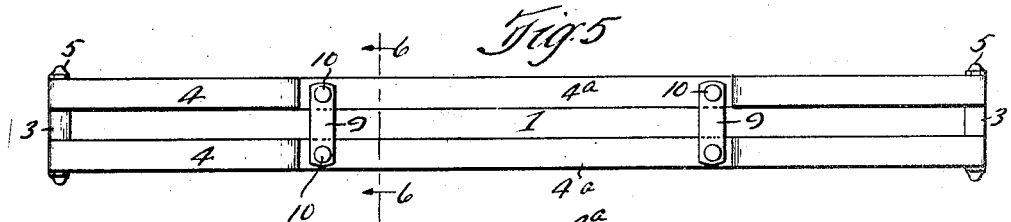
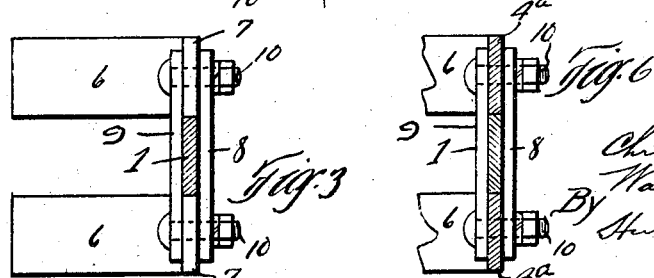
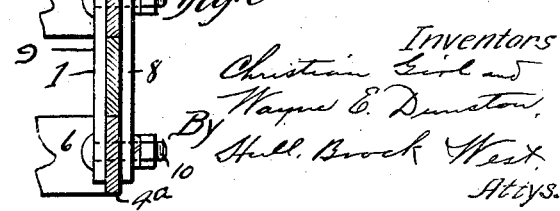

Patented Dec. 4, 1923.

1,476,605

UNITED STATES PATENT OFFICE.

CHRISTIAN GIRL AND WAYNE E. DUNSTON, OF KALAMAZOO, MICHIGAN.

AUTOMOBILE BUMPER.

Application filed January 31, 1923. Serial No. 615,984.

*To all whom it may concern:*

Be it known that we, CHRISTIAN GIRL and WAYNE E. DUNSTON, citizens of the United States, residing at Kalamazoo, in the county of Kalamazoo and State of Michigan, have invented a certain new and useful Improvement in Automobile Bumpers, of which the following is a full, clear, and exact description, reference being had to the accompanying drawings.

This invention relates to automobile bumpers, and more particularly to bumpers which are adapted to be applied to the rear of automobiles to protect the fenders thereof and to accommodate and permit the convenient handling of a spare tire.

In the construction shown herein, the end portions of the bumpers are projected rearwardly so as to cover and protect the fenders with which they cooperate and are preferably made of several bars or plates, the intermediate portion which connects the end portions being offset forwardly or toward the vehicle with reference to the end portions and providing, between such rearwardly projecting portions, a space or pocket for the reception of a spare tire.

In the drawings, Fig. 1 represents a plan view of a bumper constructed in accordance with our invention; Fig. 2 an elevation of the same; Fig. 3 a detail in section corresponding to the line 3—3 on Fig. 2; and Figs. 4 and 5 views, similar to views 1 and 2, respectively, showing a modified form of the invention; and Fig. 6 a sectional detail corresponding to the line 6—6 of Fig. 5.

For convenience of description, the bumper will be assumed to be in the position which it occupies when applied to the rear end of an automobile, and the terms "front" and "rear" will be used accordingly but without any intention of necessarily limiting the application of the bumper to any particular part of the vehicle.

Describing the parts by reference characters, 1 denotes a continuous bar adapted to extend across the rear of an automobile and the fenders thereof and to be supported in any convenient manner from the rear ends of the side members of the vehicle, as by clamps 2, adjustably mounted upon such bar. The ends of the bar are curved forwardly, or toward the vehicle, and are provided each with an eye 3. 4 denote upper and lower bars, each having an eye at one end, and adapted to be connected to the corresponding end of the bar 1 by means of a bolt 5 extending through the aligned eyes, the eye 3 being interposed between the eyes on the ends of the bars 4.

The bars 4 project rearwardly with respect to the bar 1 and are then bent forwardly or toward the bar 1, as indicated at 6, the extreme inner ends of the bars 4 being located above and below the bar 1 respectively, and preferably being extended in the vertical plane of the said bar, as indicated at 7. The ends 7 are conveniently secured to the bar 1 by means of clamping plates 8 and 9 and bolts 10.

The construction of the parts 3—10, inclusive, is duplicated at the opposite end of the bumper structure, and the parts at such end are designated by the same reference characters as are employed for those just described.

A bumper constructed in the manner disclosed herein is provided with exceedingly strong end portions (composed of the parts 2—10, inclusive), which end portions extend across and efficiently protect the fenders. The bars 4 are offset rearwardly from the bar 1 a sufficient distance and are of such length as to provide a space between the pairs of bars at each end of the bumper within which a spare tire, indicated at 11, may be placed, and preferably with its central rearwardly-presented surface within the pocket formed by the intermediate portion of the bar 1 and the portions 7 of the bars 4.

In Figs. 4 and 5 there is shown a modification of our invention, wherein the bars 4 extend continuously for the full length of the bumper, the central portion of the bars being extended above and below the bar 1, as indicated at 4ª and being connected to said bar 1 by clamps 8 and 9 and bolts 10 which are shown as identical with the like-identified clamps and bolts in the preceding views.

Viewed in plan, the parts shown in Figs. 4 and 5 will appear as substantially identical with those shown in Figs 1 and 2. However, in the latter form of our invention, the central or intermediate portion of the bumper will consist of three vertically arranged bars; and the spare tie 11 will be placed in the pocket formed at the rear of these bars and between the parts 7 of the bars 4.

In practice, the bars 1 and 4 have been formed of ordinary spring-plate material, and they are indicated herein as made of such material. The forwardly offset space or pocket is shown as only of sufficient depth to accommodate a single tire. However, it will be obvious that the depth of this pocket or offset portion of the bumper may be made greater, if desired, in order to accommodate an additional spare tire therewithin.

In the description and claims, the bumper is assumed to be applied to the rear of the automobile, in which case the bar 1 occupies a front position and the bars 4 a rear position, and the terms "front" and "rear" have been applied in accordance therewith to the said bars, but merely as a matter of convenient reference: It will be obvious that, if the bumper were applied to the front of the automobile, the positions of the bars would be reversed. Hence we do not propose to limit the use of our bumper to any particular portion of the automobile by this use of the terms "front" and "rear".

Having thus described our invention, what we claim is:

1. A bumper comprising a continuous bar having eyes at its ends and bars also having eyes at their ends and arranged respectively above and below the first-mentioned bar, bolts extending through the aligned eyes of said bars, the second-mentioned bars having end portions projecting rearwardly with respect to the corresponding end portions of the first-mentioned bar, said second-mentioned bars then extending forwardly toward and being connected to spaced intermediate portions of the first-mentioned bar, whereby a forwardly offset space or pocket is provided at the rear of the intermediate portion of the first-mentioned bar for the reception of a tire.

2. An automobile bumper comprising a front bar having an eye at an end thereof, a pair of bars each having an eye at an end thereof and located above and below the first-mentioned bar respectively, said eyes being connected by a bolt, the said end portion of each of the second-mentioned bars being projected rearwardly with respect to the corresponding portion of the first-mentioned bar and each of the second-mentioned bars being bent inwardly toward and above and below the first-mentioned bar, respectively, and connected thereto.

3. An automobile bumper comprising a front bar having its ends curved forwardly and provided each with an eye, an upper and a lower bar each having an eye at each end thereof arranged to be aligned with and connected to the eyes of the first-mentioned bar, each of the second-mentioned bars being curved rearwardly at its end portion thereby to provide end portions projecting rearwardly beyond the corresponding end portions of the first-mentioned bar, each of the second-mentioned bars having an intermediate portion projected into substantially the plane of the first-mentioned bar, and means connecting the intermediate portions of said bars.

4. An automobile bumper comprising an intermediate bar and a pair of bars located above and below the intermediate bar, respectively, each of the last-mentioned bars having its ends connected to the ends of the first-mentioned bar and each having end portions projecting rearwardly with respect to the corresponding end portions of the first-mentioned bar, the intermediate portions of the second-mentioned bars being projected forwardly above and below the intermediate bar, respectively, and connected thereto, whereby the intermediate portion of the bumper is forwardly offset for the reception of a spare tire.

5. An automobile bumper comprising a front bar, and rear bars connected to the ends of said front bar and projected rearwardly from such ends and then extended forwardly toward and connected to the said front bar, thereby forming a bumper having rearwardly projecting fender-protecting portions and an intermediate pocket or offset portion for the reception of a tire.

6. An automobile bumper having its end portions deflected rearwardly to provide fender-protecting portions, and having an intermediate portion between such end portions and located forwardly of the rear parts of such end portions, said intermediate portion and the end portions providing a space at the rear of the intermediate portion for the reception of a tire.

7. A bumper having rearwardly projecting multiple-bar end-portions adapted to extend across and protect the fenders of an automobile and an intermediate portion between such end portions and located forwardly of the rear parts of such end portions, said intermediate portion and the end portions providing a space at the rear of the intermediate portion for the reception of a tire.

8. A bumper having end portions adapted to extend across the fenders of an automobile and having an intermediate portion between such end portions and located forwardly of the rear parts of such end portions, said intermediate portion and the end portions providing a space at the rear of the intermediate portion for the reception of a tire.

9. A bumper having multiple-bar end portions adapted to extend across and protect the fenders of an automobile and an intermediate portion between such end portions and located forwardly of the rear parts of such end portions, said intermediate portion and the end portion providing a space at the rear of the intermediate portion for the reception of a tire.

In testimony whereof, we hereunto affix our signatures.

CHRISTIAN GIRL.
WAYNE E. DUNSTON.